US009378009B2

(12) United States Patent
Lin

(10) Patent No.: US 9,378,009 B2
(45) Date of Patent: Jun. 28, 2016

(54) METHOD AND DEVICE FOR ACCELERATING RUNNING OF SOFTWARE

(71) Applicant: Tencent Technology (Shenzhen) Company Limited, Shenzhen, Guangdong (CN)

(72) Inventor: Daozheng Lin, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/736,875

(22) Filed: Jun. 11, 2015

(65) Prior Publication Data

US 2015/0277896 A1 Oct. 1, 2015

Related U.S. Application Data

(63) Continuation of application No. PCT/CN2014/070011, filed on Jan. 2, 2014.

(30) Foreign Application Priority Data

Mar. 21, 2013 (CN) .......................... 2013 1 0093016

(51) Int. Cl.

| | |
|---|---|
| ***G06F 3/00*** | (2006.01) |
| ***G06F 9/445*** | (2006.01) |
| ***G06F 12/08*** | (2016.01) |
| ***G06F 9/30*** | (2006.01) |
| ***G06F 11/36*** | (2006.01) |

(52) U.S. Cl.

CPC .............. *G06F 8/67* (2013.01); *G06F 9/30047* (2013.01); *G06F 11/3612* (2013.01); *G06F 12/0862* (2013.01); *G06F 2212/6028* (2013.01)

(58) Field of Classification Search

CPC ........................... G06F 11/3466; G06F 13/385
USPC ................................................ 710/1; 717/127
See application file for complete search history.

(56) References Cited

U.S. PATENT DOCUMENTS 8,423,720 B2 * 4/2013 DöRing .............. G06F 12/0862 710/305

FOREIGN PATENT DOCUMENTS

| | | |
|---|---|---|
| CN | 1543092 A | 11/2004 |
| CN | 100573437 C | 12/2009 |
| CN | 102662713 A | 9/2012 |
| CN | 103150167 | 6/2013 |

OTHER PUBLICATIONS

International Search Report and Written Opinion issued in corresponding case PCT/CN2014/070011, dated Mar. 27, 2014, pp. 1-8.

* cited by examiner

*Primary Examiner* — Andy Ho
(74) *Attorney, Agent, or Firm* — Brinks Gilson & Lione

(57) ABSTRACT

A method and a device for accelerating running of software are provided. The method includes: determining whether the software enters a specific scene of the software; and in the case where the software enters the specific scene, sending an incorporated I/O request corresponding to the specific scene to a file system; where the incorporated I/O request incorporates at least two first (e.g., original) I/O requests corresponding to the specific scene of the software. With the above technical solution, the number of I/O requests can be reduced, and the frequency of I/O track seeks can be reduced. The running of software can be accelerated due to reducing of the time spent on the I/O track seek.

12 Claims, 3 Drawing Sheets training
application
prefetch data
page fault data and I/O data
I/O request
file system
prefetch
prefetch module
I/O request
application
Incorporated I/O request
file system

METHOD AND DEVICE FOR ACCELERATING RUNNING OF SOFTWARE

CROSS-REFERENCES TO RELATED APPLICATIONS

This application claims priority to and is a continuation of PCT/CN2014/070011, filed on Jan. 2, 2014 and entitled "METHOD AND DEVICE FOR ACCELERATING RUNNING OF SOFTWARE", which claims priority to Chinese Patent Application No. 201310093016.7, entitled "METHOD AND DEVICE FOR ACCELERATING RUNNING OF SOFTWARE", filed with State Intellectual Property Office of PRC on Mar. 21, 2013, each of which are incorporated herein by reference in their entireties.

TECHNICAL FIELD

The present disclosure relates to electronic information, and also to a method and a device for accelerating running or execution of software.

BACKGROUND

Whenever a fixed action, such as starting software, opening a menu of software, or an operation of login in an online game, is triggered, execution logic of the software is relatively fixed because these fixed actions all belong to a specific scene of the software. And thus input/output (I/O) data to be read is also relatively fixed.

Files on the disk need to be accessed during the running of software, and the data accessed by the software in a specific scene of the software is relatively fixed.

However, in accessing the I/O data, running speed and the response speed of the software are lower due to a low degree of parallelism.

SUMMARY

A method and a device for accelerating running or execution of software are provided according to the embodiments of the present disclosure, by which the running speed and the response speed of the software can be improved.

It is provided a method for accelerating running of software, which includes:

determining whether the software enters a specific scene of the software; and sending an incorporated I/O request corresponding to the specific scene to a file system in the case where the software enters the specific scene of the software; wherein the incorporated I/O request incorporates at least two original I/O requests corresponding to the specific scene of the software.

It is provided a device for accelerating running of software, which includes:

a scene determining unit, configured to determine whether the software enters a specific scene of the software; and a request sending unit, configured to send an incorporated I/O request corresponding to the specific scene to a file system in the case where it is determined by the scene determining unit that the software enters the specific scene of the software, wherein the incorporated I/O request incorporates at least two original I/O requests corresponding to the specific scene of the software.

It is provided a non-transitory storage medium, in which executable instructions are stored, the instruction executable instructions are configured to implement a method for accelerating running of software, and the method includes:

determining whether the software enters a specific scene of the software; and sending an incorporated I/O request corresponding to the specific scene to a file system in the case where the software enters the specific scene of the software; wherein the incorporated I/O request incorporates at least two original I/O requests corresponding to the specific scene of the software.

As can be seen from the above technical solutions, the number of the I/O requests can be reduced and, accordingly, the frequency of I/O track seek can be reduced. The running of software can be accelerated due to reducing the time spent on the I/O track seek.

DETAILED DESCRIPTION

The present disclosure will be described further in detail below in conjunction with the accompany drawings, so that the objects, the technology solutions and the advantages of the present disclosure will be clearer. It is obvious that the embodiments described are only a part of the embodiments according to the present disclosure rather than all of the embodiments. All the other embodiments obtained by those skilled in the art based on the embodiments in the present disclosure without any creative work belong to the scope of protection of the present disclosure.

Figure 1:
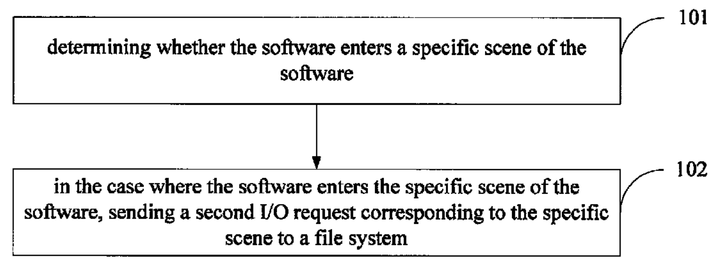
FIG. 1 is a schematic flowchart of a method for accelerating running of software according to an embodiment of the present disclosure.

A method for accelerating running of software is provided according to an embodiment of the present disclosure, referring to FIG. 1, which includes steps 101 to 102.

Step 101 may include determining whether the software enters a specific scene of the software, which may refer to entering or accessing a specific portion, section, element, or functionality of the software.

The specific scene may indicate that data accessed by the software during the running of the software is relatively fixed. For example, starting software, opening a menu of software, and an operation of login in online games, all belong to the specific scenes of the software. Whenever these specific scenes are triggered, execution logic of the software is relatively fixed, and input/output (I/O) data to be accessed is also relatively fixed.

Step 102 may include, in the case where the software enters the specific scene of the software, sending a second I/O request corresponding to the specific scene to a file system; wherein the second I/O request incorporates at least two first I/O requests, and one or more of the first I/O requests may be an original I/O request corresponding to the specific scene of the software.

How to obtain the second I/O request in step 102 is provided according to some implementations of the present disclosure. In some implementations, a "learning scheme" is used. Before starting the software (e.g., before starting a particular execution or instantiation of the software), the method may further include capturing the first I/O request of the software (e.g., of a previous execution or instantiation) and acquiring I/O data of the first I/O request. The first I/O request may be an original (e.g., non-incorporated) I/O request corresponding to the specific scene of the software that was previously executed. The method may also further include incorporating at least two first I/O requests into the second I/O request, and associating the second I/O request and pre-fetch data of the at least two first I/O requests with the file system.

Herein, the two first I/O requests may be at least two adjacent or consecutive first I/O requests. Moreover, all the adjacent first I/O requests corresponding to a specific scene may be incorporated into one second I/O request. Since the adjacent first I/O requests are incorporated, the number of the I/O requests may be reduced, and the running speed of the software may be further improved.

According to some embodiments of the present disclosure, capturing the first I/O request of the software may include:

determining whether the software is presently in (e.g., presently executing) the specific scene of the software;

capturing an I/O request of the software as the first I/O request in the case where the software is in the specific scene of the software.

The step of associating the second I/O request and prefetch data of the at least two first I/O requests with the file system may include:

recording page fault data and I/O data of the first I/O request of the software after the first I/O request is captured; converting the page fault data and the I/O data into the prefetch data; and associating the prefetch data and the second I/O request with the file system.

The methods discussed above may reduce the number of the I/O requests to the file system. Accordingly, the frequency of I/O track seeks or other accesses can be reduced. The running of software can be accelerated due to reducing the time spent on the I/O track seek.

Furthermore, a description of various opportunities and conditions for performing the prefetch are also provided. In some implementations, a "prefetch scheme" is implemented. Before sending the second I/O request corresponding to the specific scene to the file system, the method may further include:

if the software is presently in (e.g., presently executing) the specific scene of the software, capturing a current I/O request of the software as the first I/O request and determining whether there is a second (e.g., incorporated) I/O request corresponding to the current I/O request;

in the case where there is no second I/O request corresponding to the current I/O request, sending the current I/O request to the file system;

in the case where there is a second I/O request corresponding to the current I/O request, the second (e.g., incorporated) I/O request to the file system instead of sending the current I/O request.

Figure 2:
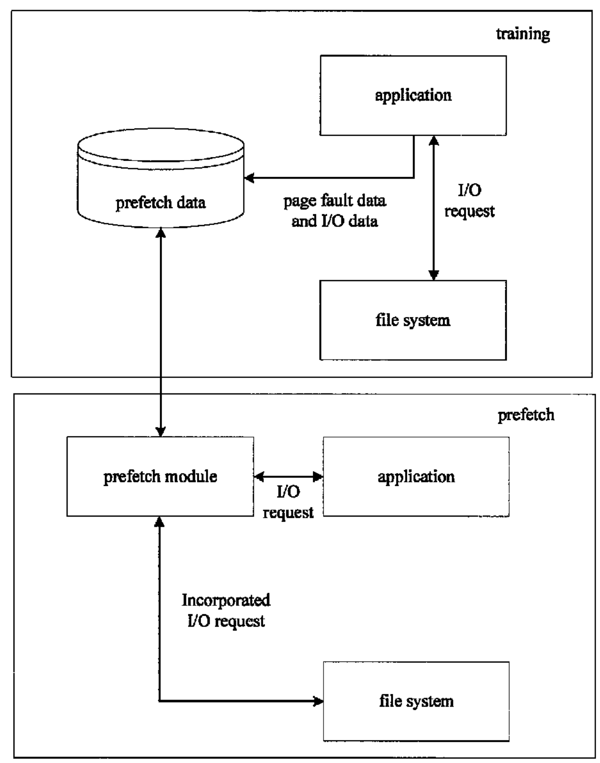
FIG. 2 is a schematic flowchart of a work for starting software according to an embodiment of the present disclosure.

According to the above, fragmentary or multiple I/O requests are incorporated more efficiently in the specific scene of the software, thus reducing the number of I/O requests. One exemplary scene of starting software is taken as an example, and the main workflow is shown in FIG. 2, which includes two portions of learning and prefetch.

The learning portion may include collecting the data to be read in advance of (e.g., prior to) or at the starting of the software. In some embodiments, the data to be read at starting execution of the software may include the prefetch data of the software. The adjacent I/O requests captured are incorporated. Referring to FIG. 2, page fault data and I/O data may be captured during running of an application, and they are incorporated into prefetch data and stored. An I/O request can be generated during an execution of the application and can be sent to (e.g., stored in) the file system, and the file system may return I/O data corresponding to the I/O request, e.g., as the prefetch data.

The prefetch portion may be performed after the portion of the training is completed. That is, the prefetch data may exist or be stored before starting the software. The I/O requests for reading the content of the files are intercepted at the starting the software. Then, the fragmentary I/O requests are incorporated and sent to the file system by a prefetch module. The data corresponding to the incorporated I/O requests is stored in the memory by the file system.

To provide on illustration, the number of the I/O requests at the starting software may be 1000. After the I/O requests are incorporated by the logic according to the embodiments of the present disclosure, the number of the I/O requests may be reduced from 1000 to 100, e.g., by incorporating multiple I/O requests together. Although the total data size of one I/O request may become greater, the number of the I/O requests are reduced by 900. That is, the frequency of I/O track seeks (or other I/O accesses) is reduced by 900. In a conventional mechanical hard disk, the time spent on an I/O track seek is greater than that on the reading. Although redundant I/O data may be read, the time spent on waiting for the I/O requests by the software can be reduced. Thus the running and the response of the software can be accelerated.

Another exemplary example for speeding up the starting of software is provided next, which is divided into two portions—a learning scheme and a prefetch scheme. One exemplary implementation is as follows.

1. Learning Scheme

Figure 3:
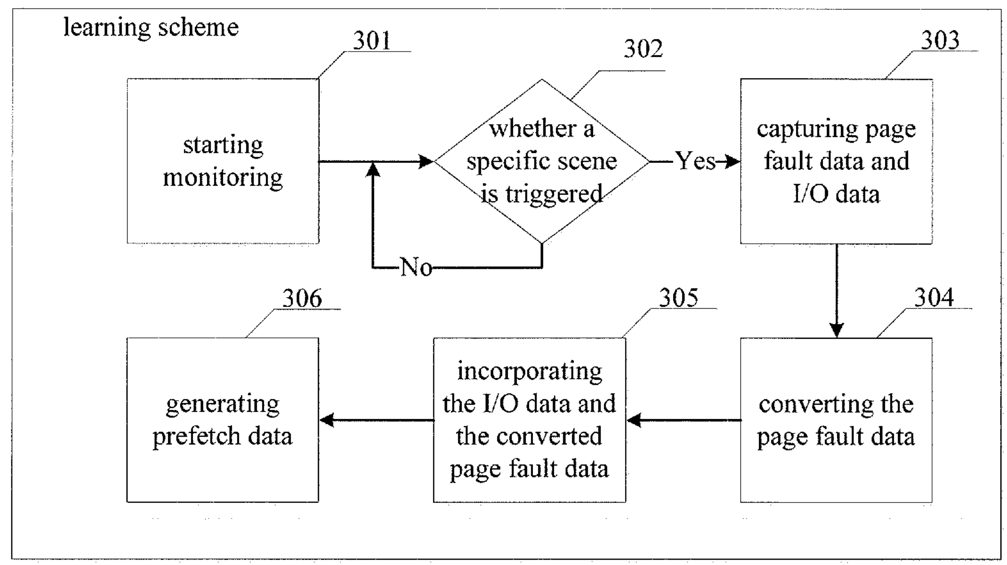
FIG. 3 is a schematic flowchart of a learning scheme according to an embodiment of the present disclosure.

Reference is made to a flowchart of an example of a learning scheme shown in FIG. 3. The learning scheme may be a pre-operation performed for speeding up the target software. In this example, the learning scheme includes steps 301 to 306.

Step 301 may include monitoring an action of the target software.

Step 302 may include determining whether the target software enters a specific scene; if the target software does not enter the specific scene, continuing the monitoring; and if the target software enters the specific scene, proceeding to step 303.

Step 303 may include capturing one or more first I/O requests of the target software and page fault data and I/O data of the first I/O requests.

Step 304 may include converting the page fault data of the first I/O requests.

Step 305 may include incorporating the I/O data of the first I/O requests and the converted page fault data of the first I/O requests.

The incorporating may refer to incorporating the page fault data and I/O data of fragmentary I/O requests. For example, the I/O data of two I/O requests is captured as shown in the following example shown in Table 1.

TABLE 1

| State of incorporating | File name | File offset | File size |
|---|---|---|---|
| Before incorporating | C:\windows\system32\ntdll.dll | 1024 | 4096 |
| | C:\windows\system32\ntdll.dll | 8192 | 4096 |
| After incorporating | C:\windows\system32\ntdll.dll | 1024 | 11264 |

It can be seen that the two fragmentary I/O requests to the file "C:\windows\system32\ntdll.dll" are incorporated into one incorporated I/O request that includes both the two fragmentary requests. That is, the data of the incorporated I/O request includes the data of the adjacent two I/O requests.

Step 306 may include generating prefetch data.

2. Prefetch Scheme

Figure 4:
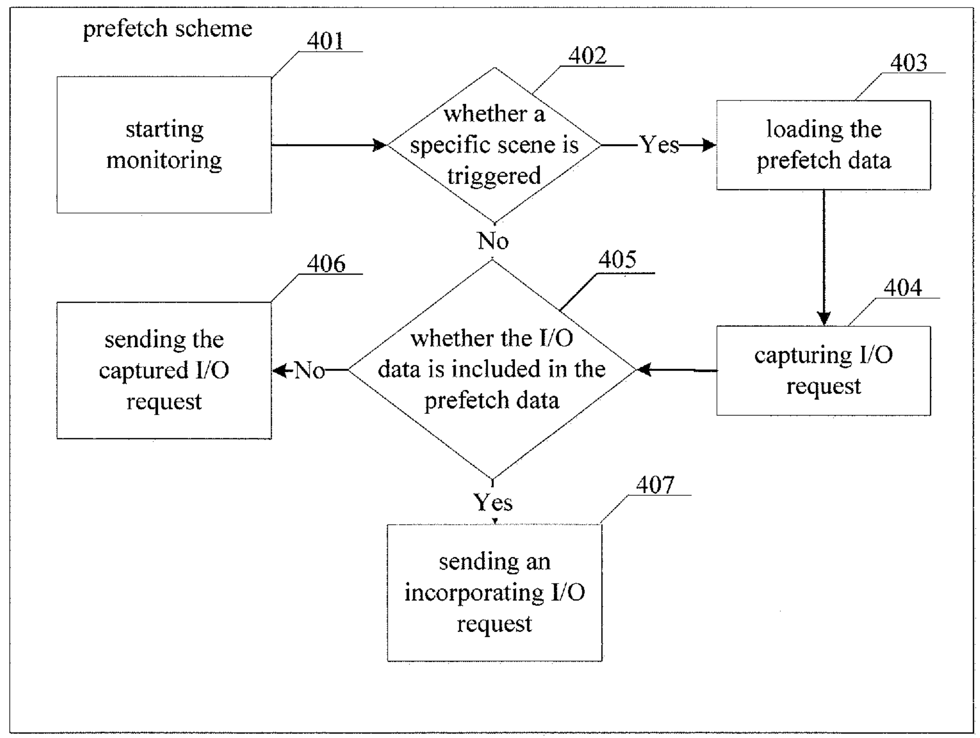
FIG. 4 is a schematic flowchart of a prefetch scheme according to an embodiment of the present disclosure.

Reference is made to a flowchart of an exemplary prefetch scheme shown in FIG. 4. The prefetch scheme may be performed after the learning scheme is completed. Herein, the prefetch scheme includes steps 401 to 407.

Step 401 may include monitoring an action of the target software.

Step 402 may include determining whether the target software enters the specific scene; if the target software does not enter the specific scene, proceeding to step 405; and if the target software enters the specific scene, proceeding to step 403.

Step 403 may include loading the prefetch data into the memory.

Step 404 may include capturing an I/O request of the target software and I/O data of the I/O request.

Step 405 may include determining whether the I/O data of the I/O request is included in the prefetch data. For example, it may be determined that the I/O data of the I/O request is included in the prefetch data by inquiring whether the captured I/O request is included in the incorporated I/O request. If the I/O data is included in the prefetch data, proceeding to step 407; and if the I/O data is not included in the prefetch data, proceeding to step 406.

Step 406 may include sending the captured I/O request to the file system.

Step 407 may include sending an incorporated I/O request to the file system.

In the above prefetch scheme, firstly, an I/O request of the software is captured, and then it is inquired whether the captured I/O request is included in an incorporated I/O request. Referring to Table 1, in one exemplary illustration, an I/O request for <C:\windows\system32\ntdll.dll, 1024, 4096> is captured. And it is determined that the captured I/O request is included in the incorporated I/O request of <C:\windows\system32\ntdll.dll, 1024, 11264>. As such, the file system may read the incorporated I/O request of <C:\windows\system32\ntdll.dll, 1024, 11264> into the memory, e.g., instead of the captured I/O request of <C:\windows\system32\ntdll.dll, 1024, 4096>. In this way, another I/O request of <C:\windows\system32\ntdll.dll, 8192, 4096> that is also incorporated into the incorporated I/O request of <C:\windows\system32\ntdll.dll, 1024, 11264> is also stored in the memory by the file system. When the software needs to use the data of the I/O request of <C:\windows\system32\ntdll.dll, 8192, 4096>, it is unnecessary to send the I/O request of <C:\windows\system32\ntdll.dll, 8192, 4096>, because it is in the memory already through performing the incorporated I/O request. In this way, the number of I/O requests and the frequency of I/O track seek are reduced. Thereby, the running and the response of the software can be accelerated.

Figure 5:
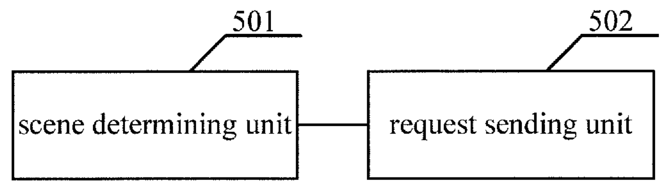
FIG. 5 is a schematic structural diagram of a device for accelerating running of software according to an embodiment of the present disclosure.

A device for accelerating running of software is further provided according to an embodiment of the present disclosure, referring to FIG. 5, which includes a scene determining unit 501 and a request sending unit 502.

The scene determining unit 501 may be configured to determine whether the software enters a specific scene of the software.

The specific scene indicates that a scene in which data accessed by the software during the running of the software is relatively fixed. For example, starting software, opening a menu of software and an operation of login in online games, these all belong to the specific scenes of the software. Whenever the specific scenes are triggered, execution logic of the software is relatively fixed, and I/O data to be accessed is also relatively fixed.

The request sending unit 502 may be configured to send a second (e.g., incorporated) I/O request corresponding to the specific scene to a file system in the case where it is determined by the scene determining unit 501 that the software enters the specific scene of the software; herein the incorporated I/O request incorporates at least two first I/O requests, and the first I/O requests may be any I/O request corresponding to the specific scene of the software.

With the above solutions, the number of the I/O requests can be reduced, accordingly, the frequency of I/O track seek can be reduced. The running of software can be accelerated due to reducing the time spent on the I/O track seek.

Figure 6:
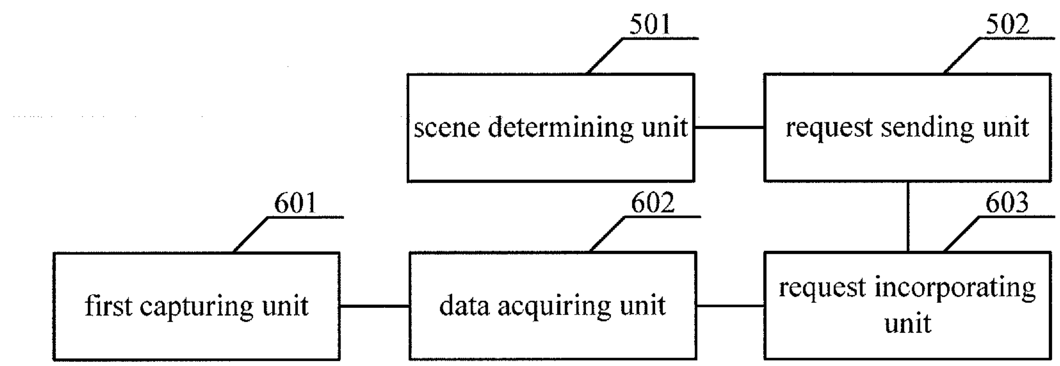
FIG. 6 is a schematic structural diagram of a device for accelerating running of software according to an embodiment of the present disclosure.

Another example of a device for accelerating running of software is provided according to an embodiment of the present disclosure. As shown in FIG. 6, the device includes: a first capturing unit 601, a data acquiring unit 602, and a request incorporating unit 603.

The first capturing unit 601 may be configured to capture a first (e.g., original) I/O request of the software.

The data acquiring unit 602 may be configured to acquire I/O data of the first I/O request captured by the first capturing unit 601.

The request incorporating unit 603 may be configured to incorporate at least two first I/O requests captured by the first capturing unit 601 into a second I/O request, and associate the second I/O request and prefetch data of the at least two first I/O requests with the file system.

Preferably, the request incorporating unit 603 is configured to incorporate at least two adjacent or fragmentary first I/O requests captured by the first capturing unit 601 into a second I/O request, e.g., an incorporated I/O request. The adjacent or fragmentary first I/O requests are incorporated, thus the quantity of the data to be read can be reduced, and thereby the running speed of the software is further improved.

Furthermore, the scene determining unit 501 may be further configured to determine whether the software is in the specific scene of the software before the first I/O request of the software is captured by the first capturing unit 601.

Specifically, the first capturing unit 601 may be configured to capture the I/O request of the software as the first I/O request in the case where the software is in the specific scene of the software.

Specifically, the data acquiring unit 602 may be configured to record page fault data and I/O data of the first I/O request of the software after the first I/O request of the software is captured by the first capturing unit 601.

The request incorporating unit 603 may be further configured to convert the page fault data and I/O data of the first I/O requests recorded by the data acquiring unit 602 into the prefetch data of the first I/O requests, and associate the prefetch data with performing the second (e.g., incorporated) I/O request to the file system.

Figure 7:
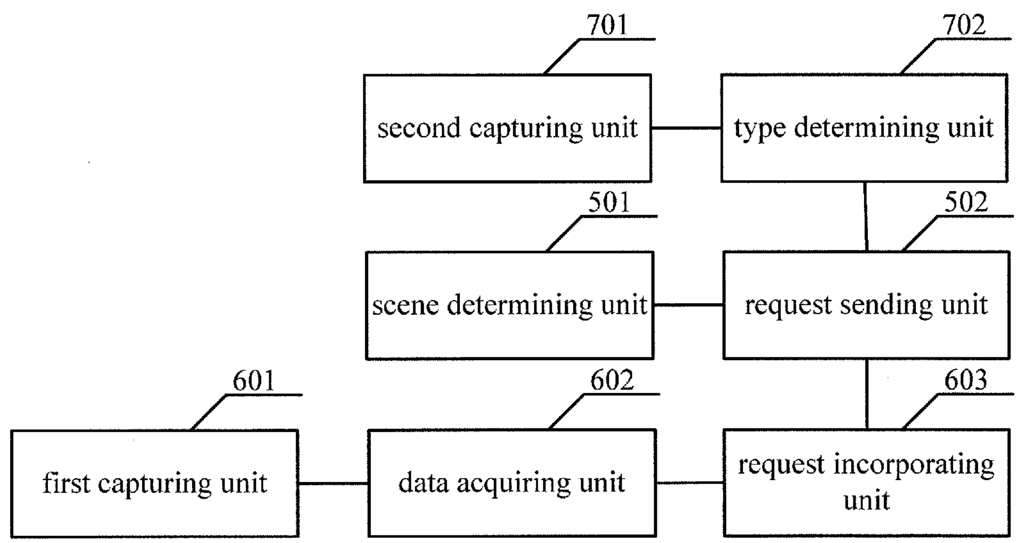
FIG. 7 is a schematic structural diagram of a device for accelerating running of software according to an embodiment of the present disclosure.

Furthermore, another exemplary device for accelerating running of software is also provided according to an embodiment of the present disclosure. As shown in FIG. 7, the device includes: a second capturing unit 701 and a type determining unit 702.

The second capturing unit 701 may be configured to capture a current I/O request of the software as the first I/O request in the case where the software is in the specific scene of the software, before the incorporated I/O request corresponding to the specific scene is sent to the file system by the request sending unit 502.

The type determining unit 702 may be configured to determine whether there is an incorporated I/O request corresponding to the current I/O request captured by the second capturing unit 701.

Specifically, the request sending unit may be configured to send the current I/O request to the file system in the case where the type determining unit 702 determines that there is no incorporated I/O request corresponding to the current I/O request; and send the incorporated I/O request corresponding to the current I/O request to the file system (e.g., instead of the current I/O request) in the case where the type determining unit 702 determines that there is a incorporated I/O request corresponding to the current I/O request.

It should be noted that in the device according to the embodiment, the included units are just divided by functional logic, which are not limited to the above-described division, as long as the corresponding function can be achieved. In addition, the specific names of the functional units are only intent to facilitate distinguish between one another, which are not intent to limit the scope of protection of the present disclosure.

In addition, it can be understood by those skilled in the art that all or some of the steps in the above-described embodiments of the method may be implemented by instructing related hardware via a program. The corresponding program may be stored in a computer-readable storage medium which may include a read-only storage, a magnetic or optical disk, etc.

The above-described are only the preferred embodiments of the present disclosure, and the scope of protection of the present disclosure is not limited thereto. Any possible modifications and alternates easy to be thought of by those skilled in the art within the technology scope disclosed according to the embodiments of the present disclosure will all fall within the scope of protection of the present disclosure. Therefore, the scope of protection of the disclosure should be defined by the claims.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A method for accelerating execution of software, comprising:

determining, by a processor, whether the software accesses a specific scene of the software; and in the case where the software accesses the specific scene of the software:

capturing, by the processor, at least two original I/O requests of the software for the specific scene and acquiring I/O data of the original I/O requests as prefetch data;

creating, by the processor, an incorporated input/output (I/O) request corresponding to the specific scene, wherein the incorporated I/O request incorporates the at least two original I/O requests;

associating, by the processor, together the incorporated I/O request and the prefetch data of the at least two original I/O requests; and sending, by the processor, the incorporated I/O request to a file system.

2. The method according to claim 1, wherein creating the incorporated I/O comprises:

incorporating, by the processor, the at least two original I/O requests into the incorporated I/O request.

3. The method according to claim 1, wherein the at least two original I/O requests are adjacent I/O requests.

4. The method according to claim 1, wherein capturing the original I/O requests of the software comprises:

determining, by the processor, whether the software is in the specific scene of the software; and, capturing, by the processor, the original I/O request in the case where the software is in the specific scene of the software.

5. The method according to claim 4, wherein associating the incorporated I/O request and the prefetch data of the at least two original I/O requests comprises:

recording, by the processor, page fault data and I/O data of the original I/O requests of the software after the original I/O request is captured;

converting, by the processor, the page fault data and the I/O data of the original I/O requests into the prefetch data of the original I/O requests; and associating, by the processor, the prefetch data and the incorporated I/O request.

6. A device for accelerating execution of software, comprising a processor and a memory having processor-executable instructions stored therein, the device being configured by the instructions executed by the processor to:

determine whether the software enters a specific scene of the software;

capture at least two original I/O requests of the software when the software enters the specific scene of the software;

acquire I/O data of the original I/O requests; and send an incorporated input/output (I/O) request corresponding to the specific scene to a file system in the case that the software enters the specific scene of the software; wherein the incorporated I/O request incorporates at least two original I/O requests corresponding to the specific scene of the software.

7. The device according to claim 6, further configured to:

incorporate the original I/O requests into the incorporated I/O request, and associate the incorporated I/O request and prefetch data of the original I/O requests together.

8. The device according to claim 7, further configured to:

incorporate at least two adjacent original I/O requests into the incorporated I/O request.

9. The device according to claim 7, further configured to:

determine whether the software is in the specific scene of the software before the original I/O request of the software is captured; and capture the original I/O request of the software in the case where the software is in the specific scene of the software.

10. The device according to claim 9, further configured to:

record page fault data and I/O data of the original I/O requests of the software after the original I/O requests of the software are captured;

convert the page fault data and the I/O data of the original I/O requests into the prefetch data of the original I/O request; and associate the prefetch data and the incorporated I/O request together.

11. The device according to claim 6, further configured to:

capture a current I/O request of the software as an original I/O request in the case where the software is in the specific scene of the software;

determine whether there is an incorporated I/O request corresponding to the current I/O request;

send the current I/O request to the file system in the case that there is no incorporated I/O request corresponding to the current I/O request; and send the incorporated I/O request corresponding to the current I/O request to the file system in the case that there is an incorporated I/O request corresponding to the current I/O request.

12. A non-transitory storage medium, in which executable instructions are stored, wherein the executable instructions, when executed by a processor, perform a method for accelerating execution of software, and the method comprising:

determining whether the software enters a specific scene of the software; and in the case where the software accesses the specific scene of the software:

capturing at least two original I/O requests of the software for the specific scene and acquiring I/O data of the original I/O requests as prefetch data;

creating an incorporated input/output (I/O) request corresponding to the specific scene, wherein the incorporated I/O request incorporates the at least two original I/O requests;

associating together the incorporated I/O request and the prefetch data of the at least two original I/O requests; and sending the incorporated I/O request to a file system.

* * * * *